L. COHEN.
CABLE SYSTEM.
APPLICATION FILED DEC. 28, 1918.

1,414,179.

Patented Apr. 25, 1922

Louis Cohen
by his attorney
Carl A. Richmond

UNITED STATES PATENT OFFICE.

LOUIS COHEN, OF WASHINGTON, DISTRICT OF COLUMBIA.

CABLE SYSTEM.

1,414,179.   Specification of Letters Patent.   Patented Apr. 25, 1922.

Application filed December 28, 1918.   Serial No. 268,722.

*To all whom it may concern:*

Be it known that I, LOUIS COHEN, a citizen of the United States, residing at Washington, in the District of Columbia, have invented a new and useful Improvement in a Cable System, of which the following is a specification.

The principal object of my invention is to provide a new and improved method for cable signalling. Another object of my invention is to provide suitable apparatus for this method. In certain aspects my invention relates to cabling by the use of alternating current and to modifying the half cycles thereof so as appropriately to represent the dots and dashes. Attention is directed to the patent to George O. Squier, No. 1,233,519, granted July 17, 1917, in which there is disclosed a cable system employing alternating current. In one aspect, my invention relates to an improved method of balancing in duplex bridge cable signalling.

In this specification and the accompanying drawings I disclose a limited number of specific embodiments of my invention, and I now proceed to describe these. It will be understood that various modifications may be made within the scope of my invention.

Figure 1:
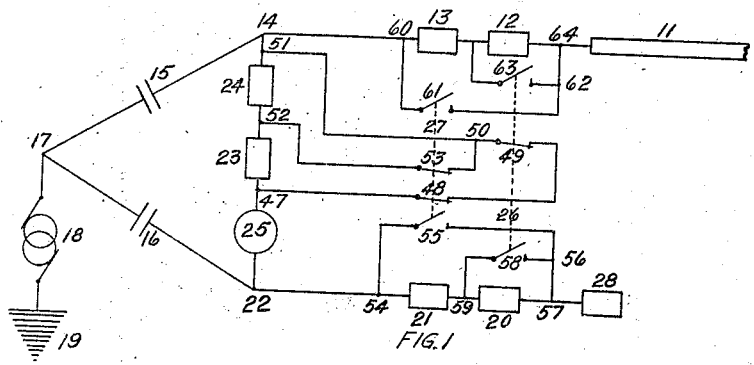
Figure 2:
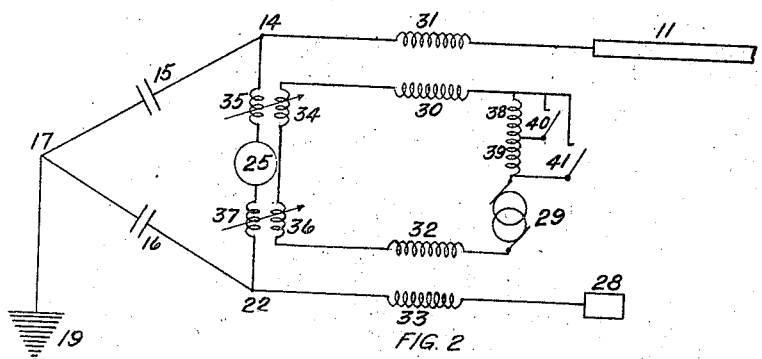
Figure 3:
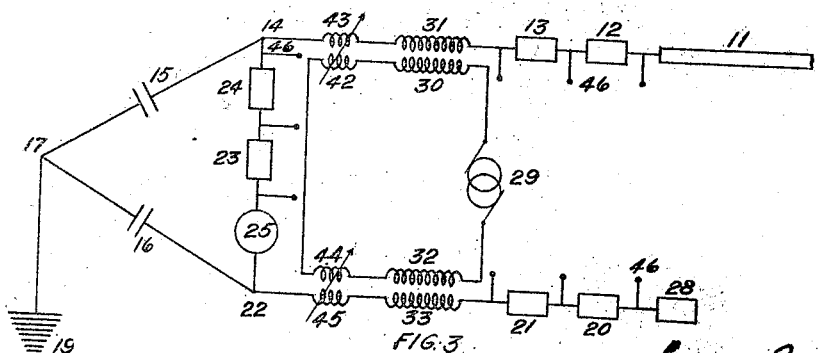

In the drawings, Figure 1 is a diagram illustrating one embodiment of my improved system and Figures 2 and 3 are corresponding diagrams illustrating modifications.

Referring particularly to Figure 1 and describing the embodiment of my invention there illustrated, the cable 11 is connected through the two sections 12 and 13 of artificial cable to the point 14 at one end of the bridge. The two local arms of the bridge comprise the respective condensers 15 and 16 and meet at the point 17 to which the connection to ground 19 is made through the alternating current generator 18.

The artificial cable 28 balancing the cable 11 is connected through the two sections of artificial cable 20 and 21 to the point 22 at the end of the bridge. The bridge comprises the indicating device 25 and the two sections of artificial cable 23 and 24.

The sections of artificial cable 12, 20 and 23 are equal in all respects and respective shunts are provided as shown in the diagram. Normally the shunts around the cable sections 12 and 20 are open at 63 and 58 respectively and the shunt around section 23 is closed at 49 and 48 and 53. There is also a single shunt provided around the pair of artificial cable sections 12 and 13 and this is normally open at 61; similarly there is a shunt around the artificial cable sections 20 and 21 normally open at 55. Also the shunts around both sections 23 and 24 are normally closed at 53 and 48, as well as at 49. Sections 13, 21 and 24 are equal in all respects.

The sections of artificial cable 12 and 13 are suitably proportioned to the cable so that by cutting them out at the sending end, the current will be substantially increased at the receiving end. The normal current strength with the artificial cable sections 12 and 13 connected in series with the cable gives a certain degree of effect on the indicating device at the receiving end for which each half cycle is interpreted as a space. Thus for a space between successive letters of a message the indication at the receiving end will be given by a single half cycle of alternating current of strength due to the presence of the artificial cable sections 12 and 13 in series. The switches 63, 49 and 58 are operated simultaneously, as indicated by the dotted line connection 26, and when they are operated from their normal condition they serve, among other functions, to shunt the artificial cable section 12, increasing the current to a certain degree, which increased current in its effect at the receiving end has the significance of a dot. Operating the switches 61, 52, 48 and 55 simultaneously, as indicated by the dotted line 27, has the effect to shunt out both artificial cable sections 12 and 13, thus increasing the current more than for a dot, and in this case the effect on the receiving apparatus at the other end of the cable is interpreted as a dash.

By suitable means not indicated in the drawing, for instance a perforated tape operated in proper synchronism, the switches on the lines 26 and 27 are operated at the instant of reversal of the alternating current, that is at the instant of zero current, and for the duration of one or more complete half cycles, so that a dot corresponds to a half cycle of moderately increased amplitude and a dash corresponds to a half cycle of greater amplitude.

By the simultaneous operation of the switches on the dotted line 26 or 27 it will be seen that the artificial cable is affected the same as the cable so that the approximate balance on the bridge 14, 22 is maintained. In order that the effect of received current impulses on the indicating device 25 may be unchanged by the operation of sending, the sections of artificial cable 23 and 24 are introduced in the bridge when the main line sections 12 and 13 are shunted. In this way the current path for received signal currents is kept constant in its characteristics so far as the indicating device is concerned, that is through the partial circuit 11, 14, 25, 22, 16, 17, 18, 19.

It will be seen that according to this embodiment of my invention, signaling is produced by changing the length of the cable. Less disturbance in the bridge balance is produced by this character of change than would be produced by cutting a lumped impedance in or out.

According to my invention as embodied in Figure 1 and the foregoing description, any residual unbalanced electrical disturbance generated at the sending point can either flow through the indicating device branch 14, 25, 22, or through the condensers 15, 16, or through either condenser 15 or 16 to ground 19. The disturbance if any will manifest itself as a slight lack of balance between the points 14 and 22, and these different paths are afforded for the resultant current impulse. Since the impedance of the indicating device branch is greater than that of the others, the latter will accordingly offer a more ready path for any such electrical disturbance which may be caused by signaling due to varying the cable length as described; and the indicating branch will accordingly be kept comparatively free from such disturbances.

In the modification shown in Figure 2 the alternating current generator 29 sends current through the transformer primaries 30 and 32 whose secondaries 31, 33 are respectively in the cable branch and artificial balancing branch. The adjustable transformers 34, 35 and 36, 37 are provided as shown in the diagram to counteract any tendency to current flow in the bridge due to a possible lack of balance across the indicating device in the bridge. The inductances 38 and 39 may be cut out in part or entirely by the respective switches 40 and 41; thus varying the amplitude of the electromotive force and producing the dot or dash signals respectively.

In this form of my invention the transformers 30, 31 and 32, 33 are identical so that any change of current in the circuit of the generator 29 affects the cable and its balancing artificial cable alike. Any residual imperfection of balance in sending which may cause a difference of potential between points 14 and 22 will generate a current, the greater part of which will flow through the condenser branch 15, 17, 16 instead of through the indicating device 25, because the condenser branch offers a less impedance to the current flow.

In Figure 3 the alternating current is generated and applied as in Figure 2 and the artificial cable sections are also employed as in Figure 1. The adjustable transformers 42, 43 and 44, 45 have their secondaries in the cable and artificial cable branches instead of in the indicating bridge as in Figure 2. The circuits and switches for shunting the artificial cable segments may be the same as for Figure 1 and may be connected to the taps 46; in this case the signalling is accomplished by varying the effective length of the cable as for Figure 1.

In general the speed of signalling depends upon the perfection of balance that is obtained. The more perfect the balance the more sensitive the detector that can be used and the consequent increase of speed that is obtainable. When alternating current is employed in signalling and when a very nearly perfect balance is obtained between the cable and the artificial cable as the two branches of the bridge, it may be possible to preserve this balance only for the steady state of the current, that is for the successive half cycles all alike. This balance may be disturbed when the amplitude of the half cycles is varied, because such a variation may give rise to accompanying transient effects. It is one purpose of my invention to modify the half cycles of alternating current in such a manner as to reduce to a large extent the transient effects usually accompanying any changes in the conditions affecting the current flow in the circuit, such as the circuit characteristics or the electromotive force.

While illustrating practical embodiments or applications of my invention hereinbefore, I have described with some degree of particularity the improved method of cable signaling as employing electromotive forces of alternating current character, it is to be expressly understood that the method is equally well and as practically adaptable for the use of an electromotive force of any other character such as conditions or preference may dictate; e. g., direct current electromotive force, variable electromotive force, etc.

I claim:

1. The method of operating a balanced bridge cable which comprises impressing electro-motive forces from a common source on the cable, the artificial cable, the bridging arm, and adjusting simultaneously the circuit characteristics of the cable, artificial cable and bridging arm and their mutual relation in such a manner that said electromotive forces shall not produce any current flow in said bridging arm.

2. The method of operating a balanced bridge duplex cable which comprises applying thereto, an electromotive force, and varying the amplitude of the current by modifying simultaneously the circuit characteristics of the cable and of the artificial cable and of the bridge containing the indicating device.

3. The method of operating a balanced bridge duplex cable which comprises applying thereto an alternating electromotive force and varying the amplitude of the current by modifying simultaneously the circuit characteristics of the cable and of the artificial cable and of the bridge containing the indicating device.

4. The method of operating a balanced bridge duplex cable which comprises generating alternating current alike in the cable and the balancing artificial cable beyond the bridging points and applying like current modifying agencies respectively to the cable and the artificial cable.

5. The method of operating a balanced bridge duplex cable which comprises generating an alternating current in the cable and modifying the half cycles for signalling by cutting out artificial cable sections from the cable and the balancing member and cutting in such sections in the bridge.

6. The method of operating a balanced bridge duplex cable which comprises applying simultaneous alternating electromotive forces to the cable and the corresponding artificial cable branch beyond the bridging points and varying amplitude of the current for signalling.

7. The method of operating a balanced bridge duplex cable which comprises sending by simultaneously varying the effective length of the cable and of the balancing artificial cable and of the bridge.

8. A balanced bridge cable equipment comprising means for generating alternating current alike in the cable and the balancing member, and means for sending by modifying a current determining factor at points in the cable and the balancing member beyond the bridging points.

9. A balanced bridge cable equipment comprising means for generating alternating current alike in the cable and the balancing member beyond the bridging points, and duplicate means associated respectively with the cable and the balancing member for modifying the current for sending purposes.

10. A balanced bridge cable equipment comprising a local circuit with means for generating an alternating current therein, said local circuit being in inductive relation to the artificial cable and its balancing branch beyond the bridging points, and means for varying the circuit characteristics of the cable and its balancing branch to vary the amplitude of the half cycles of alternating current for signalling.

LOUIS COHEN.